Nov. 6, 1962   E. J. MILLER   3,062,587
ADJUSTABLE END GATE LATCHING ASSEMBLY FOR DUMP TRUCKS
Filed Oct. 2, 1958
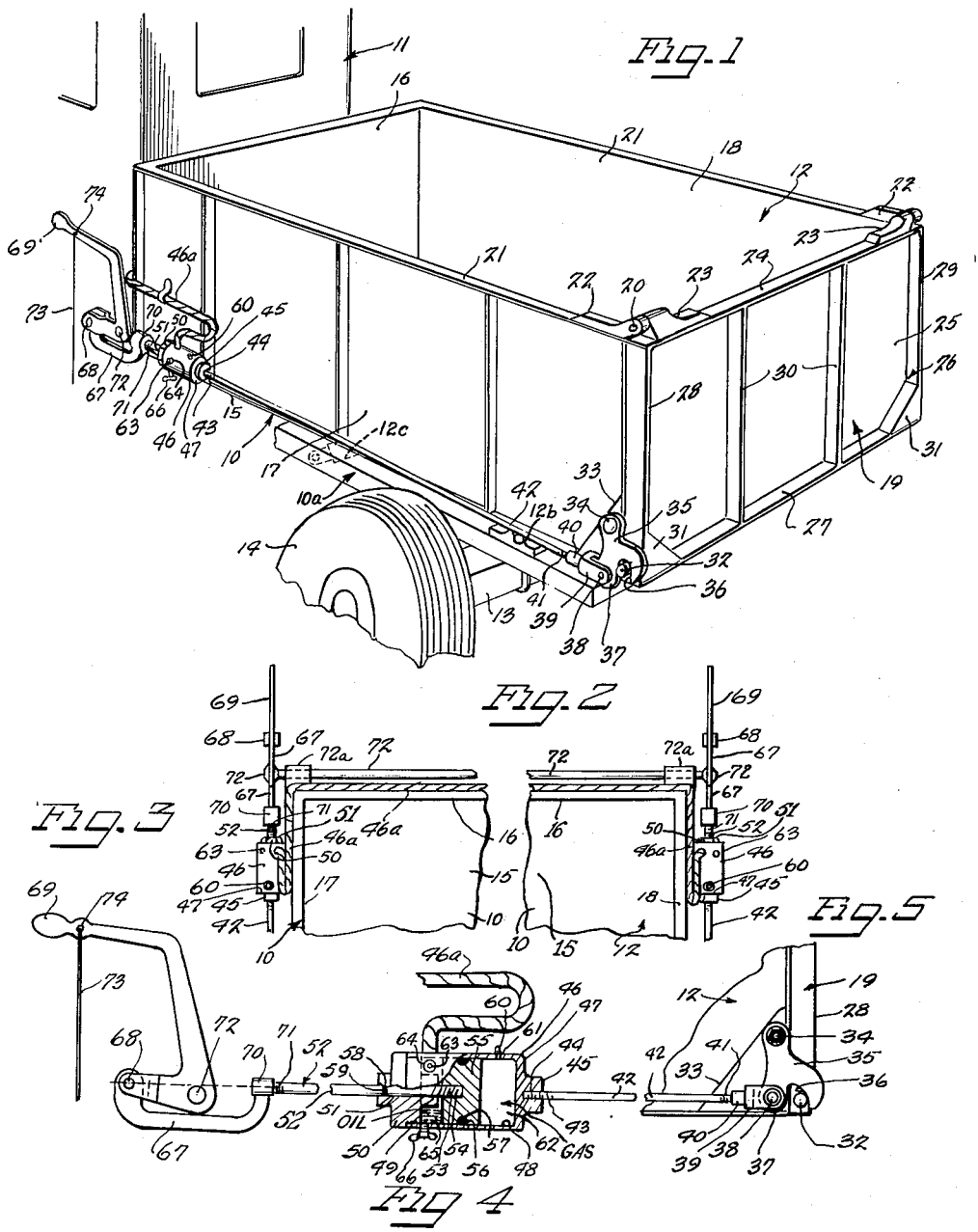
INVENTOR.
EUGENE J. MILLER
BY
Robert H. Wendt
ATTY

United States Patent Office 3,062,587
Patented Nov. 6, 1962

3,062,587
ADJUSTABLE END GATE LATCHING ASSEMBLY FOR DUMP TRUCKS
Eugene J. Miller, 411 Oak Ave., McHenry, Ill.
Filed Oct. 2, 1958, Ser. No. 764,800
15 Claims. (Cl. 298—38)

The present invention relates to end gate latching assemblies for dump trucks, and is particularly concerned with improvements in the present latching arrangements, whereby the loss of materials by reason of partly open end gates is substantially eliminated.

One of the objects of the invention is the provision of an improved end gate latching assembly for dump trucks of the type having a control lever mounted on the chassis within reach of the driver, by means of which the mechanism may be quickly adjusted so that the tight closure of the end gate is assured.

In the use of the latching assemblies of the prior art it frequently happens that the connecting rods between the latch and the control lever become bent or out of adjustment in length so that the end gate is not latched at all or it may be latched in a partly open position. This involves an adjustment which consumes the time of the driver, and which requires tools which he may have difficulty in finding.

One of the objects of the invention is the provision of such an improved latching mechanism that the adjustment may be accomplished in a fraction of a minute by the use of a grease gun.

Another object of the invention is the provision of an improved latching mechanism which provides for the automatic equalization of the length of the connecting rods by merely adjusting the mechanism on one side.

Another object of the invention is the provision of an improved adjustable connecting rod arrangement, including a hydraulic cylinder and piston in which the length is adjusted by injecting solid lubricant into the cylinder at one end and by providing air under pressure at the other end of the cylinder so that the air automatically provides room for the additional lubricant that moves the piston in such direction as to compress the air to a greater extent.

Another object of the invention is the provision of an improved tail gate latching mechanism which is simple in construction, capable of economical manufacture, which includes a minimum number of parts, which operates equally on both of the latches, and which requires a minimum amount of time for its adjustment.

Another object of the invention is the provision of an improved latch actuating assembly for the end gates of trucks, which is adapted to be employed with end gate latches of different construction, and which is of universal application as a connecting rod in latching assemblies for dump trucks.

Other objects and advantages of the invention will be apparent from the following description and the accompanying drawings, in which similiar characters of reference indicate similar parts throughout the several views.

Referring to the two sheets of drawings accompanying the specification,

FIG. 1 is a fragmentary view in perspective of a dump truck with a tilting body that is provided with a latching mechanism embodying the invention;

FIG. 2 is a fragmentary top plan view of the front part of the mechanism, in partial section;

FIG. 3 is a fragmentary view of the controlling lever;

FIG. 4 is a fragmentary sectional view taken through one of the adjusting cylinders;

FIG. 5 is a fragmentary side elevational view of the latch.

Referring to FIG. 1 the dump trucks embodying the invention are preferably provided with a cab 11 and chassis 10a supported at the rear end by springs and wheels mounted on rear axle 13; and the chassis 10a has a pivotal support 12b for the rear end of the box frame 12a, which carries the box 12, and can be lifted by hydraulic ram 12c to dump the contents of the truck or restore it to the loading condition.

The body 12 preferably comprises a metal box having a bottom 15, front wall 16, side walls 17 and 18, forming a box. The box which forms the body 12 is open at its rear end, but is closed by means of an end gate 19, which is pivotally mounted by means of the trunnions 20, which are carried by the top 21 of each side wall near its rear end and mounted upon bracket 22.

The trunnions 20 comprise pins which extend into hinge fittings 23, of which there are two on the top edge 24 of the end gate. The end gate 19 preferably comprises a rectanglar metal member formed of a sheet metal covering 25 welded or otherwise secured to a rectangular frame 26, which may have a top frame member 24, bottom 27, and two side frame members 28, 29, all welded together and braced by intermediate braces 30, 30. Corner gussets 31 welded to the end gate brace it against becoming deformed.

The end gate 19 is provided on each side wall 28, 29 with a latching keeper 32 in the form of a heavy pin or lug of cylindrical shape projecting laterally from the end gate.

The body 12 has reinforcing gusset plates 33 at the lower rear corners of the box; and these are provided with apertures for the screw bolts 34, which pass through an aperture in a latching member 35 in each case and are secured by being threaded in the plate 33 or by having a nut on the end of bolt 34.

The latch 35 comprises a heavy steel member having a partially cylindrical bottom open groove 36, which may be pivoted downward over the keeper 32 or lifted off the keeper 32. The latch 35 has a downward extension 37, which is pivotally connected by a pin 38 to a clevis 39 of the type having a threaded bore 40 for receiving the threaded end 41 of a connecting rod 42.

The connecting rod 42 has its other end threaded and indicated at 43 being threaded into a threaded bore 44 in the central hub 45, which forms a part of the cylinder 46.

The cylinder 46 comprises a cylindrical metal member which may be closed at the end 47, and which has a cylindrical bore 48 internally threaded at 49.

Bore 49 is closed by a threaded plug 50, having a cylindrical bore 51 for slidably receiving the connecting rod 52, which has its threaded end 53 threaded into a bore 54 in the piston 55. The piston 55 has a peripheral groove 56 for receiving a neoprene O ring 57. The piston rod 52 may also have a groove 58 for receiving a similar but smaller O ring 59.

The cylinder 46 is provided at one end with the standard valved gas or air fitting 60 of the type employed in tires threaded into threaded bore 61 for supplying gas or air to one side of the piston, the gas or air being indicated at 62.

The other end of the cylinder is provided with a universal lubricating fitting of the Zerk type, indicated at 63, and threaded into a threaded bore 64 for supplying oil, indicated at 65. Fitting 63 is of the type having a ball valve urged by a spring to closed position, and having a tiny opening and a sharp circular edge for engagement with a spherical socket on a grease gun.

The cylinder is first provided with air under pressure through the fitting 60, driving the piston 55 toward the other end; and then a grease gun is applied to the fitting 63, supplying sufficient hydraulic fluid such as oil, grease or the like to the other end for adjusting the length of the combined piston and cylinder, as reflected in the overall length of the connecting rod assembly 42, 46, 52. The cylinder also has a petcock 66 for permitting hydraulic fluid to be discharged from the cylinder for increasing the length of the over-all connecting rod assembly.

The piston rod 52 is connected by a clevis 67 and a pin 68 to the control lever 69. Clevis 67 has a threaded bore 70 for receiving the threaded end 71 of connecting rod 52. The control lever 69 is mounted on a transverse shaft 72, which is carried by the body 12 in suitable bearings 72a, and extends from side to side of the body 12.

The control lever 69 is preferably arranged so that it passes over dead center (see dashed line) when releasing the latch 35; and as the control lever is mounted on the dump box 12, it may be lifted high in the air with the dump box, and is preferably provided with a pull rope 73 attached in a hole 74 in the handle 69. This permits the operator to trip the latch and dump the truck when the truck is tilted.

When the truck returns to the horizontal position, the gate 26 swings to closed position, where it is secured by a clockwise movement of the control lever 69, pulling the latch 35 down on the keeper 32.

The two cylinders 46 on opposite sides of the body 12 are connected by an hydraulic fluid conduit 46a so that the oil or grease pressure is equalized in both cylinders; and both connecting rods may be adjusted by forcing oil or grease into one cylinder. In some embodiments of the invention the air valve and inlet may be omitted, and entrapped air in the cylinder may be used.

During this action the piston and cylinder serves as a rigid part of the connecting rod assembly 42; but its length may be adjusted by permitting grease to escape from the grease end of the cylinder, making the connecting rod assembly longer, or additional grease may be forced into the cylinder, making it shorter.

As the connecting rod assemblies are not usually arranged on the outside of the box, but are arranged under the floor and inside the side wall below the box, these connecting rods are relatively inaccessible; and the threaded parts may become so rusted that they cannot be adjusted.

It will thus be observed that I have invented end gate latching assemblies for dump trucks which may be conveniently adjusted to latch the end gates tightly by merely releasing some grease from the cylinder with the pet cock or by adding grease with a grease gun of the pressure type.

This arrangement saves a great deal of time and labor in the maintenance of a tight condition of the end gates; and when the end gates are kept tight and properly adjusted, there is a considerable saving in the loss of materials by leakage or improper closing.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. An end gate latching assembly for dump trucks, comprising a dump truck body pivotally mounted on a chassis and having a bottom wall, a front wall, and a pair side walls, with an open rear, an end gate pivotally mounted at the upper end of each side wall and adapted to closed the rear of the dump truck and to swing open by gravity as the body rises in front and to swing closed by gravity as the body drops in front, a latching member pivotally mounted on the side wall of the body adjacent the lower edge of the end gate, a keeper lug projecting from the end of the end gate laterally to be engaged by said latching member when the end gate is closed to hold it closed, a connecting rod pivotally connected to said latching member, a control lever mounted for pivotal movement on said body and having an arm for actuating said connecting rod to unlatch said latching member or to latch said latching member into latching position, and a hydraulic cylinder member, piston, and piston rod member, one of said members being connected to said arm and the other of said members being connected to said connecting rod for effecting a push-pull connection between them.

2. An end gate latching assembly according to claim 1, in which the cylinder contains lubricant for transmitting a pull on the connecting rod and compressed gas for transmitting a push on the connecting rod.

3. An end gate latching assembly according to claim 2, said cylinder having a one way air inflation valve and air inlet in its air end.

4. An end gate latching assembly according to claim 2, said cylinder having a lubricant filler fitting and valve in its lubricant end.

5. An end gate latching assembly according to claim 4, said cylinder having a lubricant release pet cock in its lubricant end.

6. An end gate latching assembly according to claim 1, said body having a lug and latching member for each end of the end gate and a similar arm, connecting rod, cylinder, piston, and piston rod for the second latching member, said arms being mounted on a shaft supporting said control lever.

7. An end gate latching assembly according to claim 6, and a pressure equalizing conduit connecting the lubricant ends of the cylinders.

8. An adjustable latching mechanism for dump truck body end gates, comprising a chassis, a keeper lug carried by the end gate, a pivoted latch pivoted on the dump truck body, a connecting rod having one end pivoted on the latch and the other end connected to a cylinder, a piston in said cylinder, a connecting rod carried by the piston and sliding in one end of the cylinder, a charge of hydraulic fluid in one end of the cylinder, and a charge of compressed gas in the other end of the cylinder, a control lever pivoted on the chassis, and having an arm connected to said piston rod to actuate said latch.

9. An adjustable latching mechanism according to claim 8, including a second latching keeper for the other end of the end gate, with similar connecting rod, cylinder, piston, and charges, said control lever being mounted on a shaft, and having a second arm to actuate the second latch.

10. An adjustable latching mechanism according to claim 8, said cylinder having a valved lubricant filler fitting to supply lubricant to adjust the effective length of the connecting rod, cylinder, and piston rod.

11. An adjustable latching mechanism acording to claim 10, said cylinder including a valved air inflation fitting for supplying air to the cylinder.

12. An adjustable latching mechanism according to claim 9, said cylinders having a lubricant pressure equalizing conduit connecting the lubricant ends of the cylinders.

13. An adjustable latching mechanism according to claim 9, in which the control lever and arm are arranged with a past center linkage to hold the latch in unlatched position.

14. An adjustable latching mechanism according to claim 12, in which both cylinders have valved lubricant fittings and valved air inlet fittings.

15. An adjustable latching mechanism for dump truck body end gates, comprising a truck box having an end gate pivoted to open or close an end opening in the box, said gate and box being provided with a pair of cooperating latches and keepers for holding the end gate closed at both sides of the box, an actuating rod connected to each latch and extending along the box to the front end of the box, said rod having a pair of separate sections and one section being connected to a latching handle, which is movable, to place a tension on the connecting rod sections or to release the latch, and a hydraulic cylinder connected to one of the sections of the connecting rod, and having a movable piston rod which is connected to the other section of the connecting rod and a filling of hydraulic fluid, which may be increased or diminished to adjust the length of the connecting rod assembly so that the end gate is closed tightly.

References Cited in the file of this patent

UNITED STATES PATENTS

| | | |
|---|---|---|
| 564,805 | Stoney | July 28, 1896 |
| 2,514,726 | Schonrock | July 11, 1950 |
| 2,589,872 | Schetky | Mar. 18, 1952 |
| 2,626,021 | McAlpine | Jan. 20, 1953 |
| 2,645,522 | Kersey | July 14, 1953 |
| 2,688,386 | Crookston | Sept. 7, 1954 |

FOREIGN PATENTS

| | | |
|---|---|---|
| 570,648 | France | Jan. 18, 1924 |